Sept. 16, 1969  H. A. NEWTON  3,467,269
COMPARTMENTED GLASS BOTTLES
Filed Sept. 26, 1967
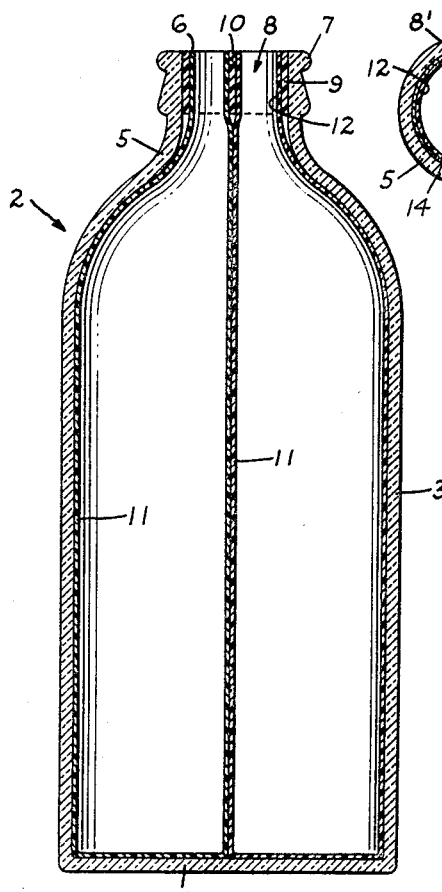
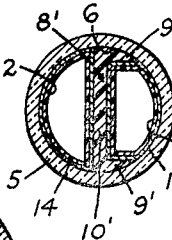
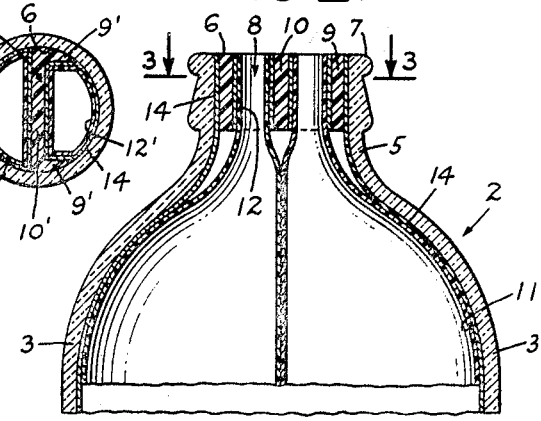
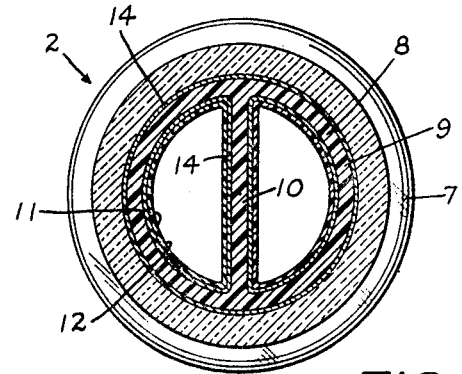
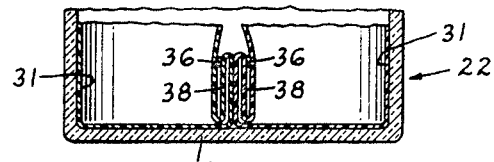
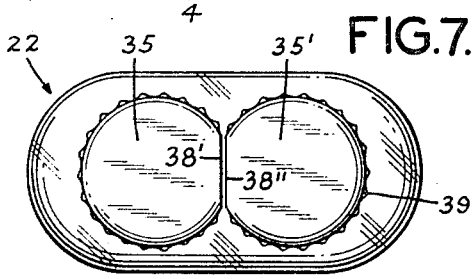
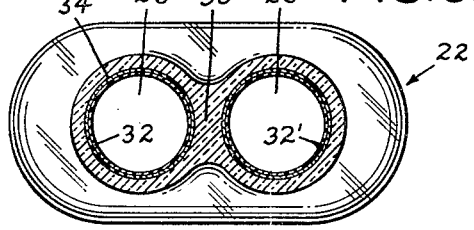
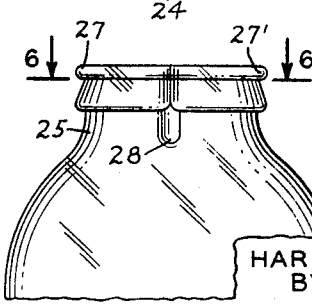
INVENTOR
HARRY A. NEWTON
BY
Andrew Kafko
ATTORNEY

United States Patent Office 3,467,269
Patented Sept. 16, 1969

3,467,269
COMPARTMENTED GLASS BOTTLES
Harry A. Newton, 231 W. Tabor Road,
Philadelphia, Pa. 19120
Filed Sept. 26, 1967, Ser. No. 670,572
Int. Cl. B65d 1/04
U.S. Cl. 215—6             9 Claims

ABSTRACT OF THE DISCLOSURE

A glass bottle is provided with separate compartments formed by a plurality of transparent or translucent plastic liner bags mounted on a neck insert for the bottle which is sealed by a conventional crown cap. In a preferred embodiment, the plastic liner bags are adhered to the neck insert for the bottle and to the interior surface of the bottle. In a modified form, the usual single neck glass bottle is replaced by a fused double necked bottle, each neck being adapted to have mounted thereon a modified crown cap, which may be removed separately. In such instance, the bags are modified to permit pressure expansion of one bag when the cap sealing the other bag is removed.

Background of the invention

The invention relates generally to containers having sealing closures therefor. More particularly, the invention relates to compartmented sealed containers for liquids generally, and particularly for potables required to be maintained under pressure, wherein compartment-providing means are provided for said containers which specifically adapt the latter for maintaining said liquids separated from each other prior to consumption.

At the present time, it is customary in the distribution of beverages, such as beer, and carbonated or non-carbonated non-alcoholic "soft" drinks, in quantities intended for individual or group consumption, to package, ship and store them in various types of containers, and particularly in glass bottles. Since said beverages may be charged and, accordingly must be kept under pressure within sealed containers prior to consumption, or are sealed for hygienic reasons; the glass bottles when used for such purpose are equipped with sealing closures that are conventionally of the long-known "crown" cap variety. Said crown caps comprise a metal disk with down-turned flanges that retain a gasket or seal of cork or other suitable material.

In the conventional packaging operation for the aforesaid bottles, the latter are filled with the beverage, under pressure or otherwise, a cap is seated on the pouring end of each bottle, and said flanges of the cap are crimped over the lip of the pouring end of the bottle that is provided for such purpose, whereby the gasket of the cap is retained in sealing relationship with said pouring end of the bottle to maintain the contents thereof under pressure and/or hygienically sealed until use.

The crown cap sealed glass bottles described above have long since been in use and are eminently suited for their particular purpose; i.e., to maintain, in pressure-sealed and/or hygienic condition, a single liquid contained therein. They are, of course, not at all adapted to maintain in said condition, more than a single liquid in a single bottle.

However, there have been various types of glass bottles proposed for maintaining a plurality of liquids separate, including bottles more elaborately adapted to keep the liquids separate until they are to be mixed prior to use. A comparatively simpler example of the latter type of glass bottle is disclosed in U.S.P. 2,753,990. In the known structures exemplified by those of said patent, the glass container has integrally formed therewith one or more compartment-separating walls of the same glass material. Such structures are inherently costly to produce, since their manufacture requires involved molding procedures. Accordingly, as far as is known, they have been used only for packaging relatively expensive liquids; e.g., alcoholic beverages, such as liqueurs, where the cost of even such an elaborate bottle may still represent only a fraction of the cost of the contents thereof. Such elaborately constructed bottles are obviously hardly useable, from the standpoint of economics, for containing non-alcoholic beverages or even alcoholic beverages of lower cost, such as beer.

Summary of the invention

With the foregoing and other disadvantages of the prior art in mind, it is a primary object of the present invention to provide a compartmented container for beverages by a comparatively simple adaptation of the conventional glass bottle with crown cap seal.

It is a further object to provide a glass bottle having a plurality of compartments therein, wherein each compartment is fully sealed against contamination, or intermingling of its liquid contents with the contents of the adjacent compartment.

It is another object of the invention to provide a compartmented bottle as aforesaid which permits maintaining separately therein two beverages of different colors and/or flavors.

Another object is to provide compartmented bottles, which when opened, permit selective imbibation of the contents of these separate compartments, separately or concurrently, with the use of straws.

It is another object of the invention to provide a modified form of compartmented bottle which permits the selective opening of only one compartment for consumption of the contents thereof, while the other compartment may remain sealed and under pressure to permit consumption at a later time, as desired.

It is another object to provide said modified form of bottle wherein the compartments are constructed to allow for pressure differentials occurring when the contents thereof are under pressure and the contents of one is consumed with concomitant pressure reduction, while the contents of the other is maintained sealed and still under pressure.

It is another object of the invention to provide methods for the assembly, filling and sealing of the various compartmented bottles of the present invention.

With the foregoing objects in view, in conjunction with other objects that will appear from reading the following detailed descriptions of various embodiments thereof, my invention resides in the novel arrangement and combination of parts, in the details, of constructions, and in the methods of manufacture, hereinafter described and claimed. It will be understood that my invention is susceptible of embodiment in many and various forms, several of which are illustrated in the accompanying drawings, and that the structural details and mode of assembly herein set forth may be varied to suit particular purposes and still remain within my inventive concept.

The invention will be more clearly understood from a consideration of the following description taken in connection with the accompanying drawings, that form a part of this specification. In such drawings, wherein like numerals identify like parts in the several views thereof:

Description of the drawings

FIG. 1 is a vertical cross-section of a conventional glass bottle provided with separate compartments formed by plastic liner bags mounted on a neck insert, in accordance with one embodiment of the present invention;

FIG. 2 is an enlarged vertical section of the upper fragment of a glass bottle similar to that depicted in FIG. 1, but modified with respect to having a discrete layer of sealing means for adhering the bags to the glass bottle and the neck insert therefor;

FIG. 3 is a horizontal section taken along section line 3—3 of FIG. 2, and still further enlarged;

FIG. 4 is a horizontal section similar to that of FIG. 3, but drawn to the scale of FIG. 1, and showing a modified form of neck insert;

FIG. 5 is a front elevational view of the upper fragment of a modified form of compartmented bottle in accordance with another embodiment of the invention;

FIG. 6 is a cross-section taken along section line 6—6 of FIG. 5 and slightly enlarged;

FIG. 7 is a top plan view of the embodiment shown in FIGS. 5 and 6, but with the crown cap closures mounted thereon and modified for adaptation to the structure of said FIGS. 5 and 6;

FIG. 8 is a cross-section view of the bottom of the bottle of FIG. 5 showing expansion folds in the lines.

Detailed description

Referring now to the drawings, and more particularly to FIG. 1, there is shown, in vertical cross-section, a conventional "soft" drink glass bottle 2 having a side wall 3, a bottom wall 4 and a neck portion 5. The latter has therein the usual outlet opening 6 surrounded by a bead or flange 7 to which the conventional crown cap (not shown in this embodiment) may be attached, as by the crimped periphery thereof, for hermetically sealing the contents of the bottle 2 which may be under pressure.

In accordance with this embodiment of the invention, there is seated, within outlet opening 6, a substantially rigid mounting insert 8, which may be of a suitable plastic material, in this instance of polyethylene. Insert 8 is formed of a cylindrical wall 9 of circumferential dimensions which adapt it to be press-fitted into outlet opening 6 for being maintained therein. Insert 8 also has a transversely disposed wall 10 extending diametrically of the cylindrical wall 9 and preferably formed integrally therewith. Diametrically disposed wall 10 imparts rigidity to insert 8, and serves another purpose which will now appear.

Insert 8 functions as a mounting ring for a pair of plastic bags 11 which may also be of a suitable plastic material in this instance, again, of polyethylene, but in this case, in the form of a flexible, transparent film. Thus, each bag 11 at its upper end 12 is heat-sealed to the inner surface of the associated half of the cylindrical wall 9 and the respectively opposed surface of the diametrically disposed wall 9 of insert 8.

In assembly of the compartmented bottle 2, each of the bags 11 is preferably mounted on one of a pair of hollow prongs (not shown), each of which is provided with a source of selectively negative or positive pressure, and has distributed over the surface thereof a plurality of apertures. The bags may be conveniently opened by application of negative pressure to the outside surfaces of said bags by means other than said prongs to permit the mounting operation just described. With the bags 11 mounted on the pair of prongs, a negative pressure is applied to the interiors of the latter, whereby said bags cling to said prongs. This facilitates insertion of said bags into the bottle 2 via outlet opening 6 of the neck portion 5, subsequently to the press-fitting of the insert 8 into said outlet opening 6. Positive pressure is then applied to the prongs which are then withdrawn to leave the bags 11 and insert 8 in place inside bottle 2. The upper portions 12 of bags 11 are then heat-sealed to said insert 8.

Bottle 2 is thereafter subjected to the usual filling operation, but with the modification that two filling nozzles are inserted into the bottle, one into each portion of insert 8 and hence, each into a different bag 11. Each of the filling nozzles is preferably attached to a source of a differently colored and/or flavored beverage. The respective liquids are then introduced into respective bags 11 under pressure and, after the bottle is filled, the usual crown cap is applied for sealing the bottle.

As appears from the foregoing, a feature of the invention is that two differently colored and/or flavored beverages are attractively packaged in a single bottle, to enhance its visual saleability. Moreover, in the use of the compartmented bottle 2, the crown cap may be removed in the usual manner. Then, a straw may be placed into one or the other of the beverage-filled bags 11 via insert 8, and the contents of the selected bag either partially or completely emptied, or two straws may be inserted for simultaneous imbibation of the vari-colored (and/or flavored) beverages.

In FIGS 2 and 3, the embodiment shown is of similar structure to that shown in FIG. 1, as appears from the identical reference numerals indicating like structures in both embodiments. The essential difference in this embodiment is that instead of the press-fit sealing of the insert 8 in the outlet opening 6 of bottle 2 and the heat-sealing of bags 11 to the insert 8, a discrete layer of adhesive 14 binds all the respectively adjacent surfaces of the insert 8, bags 11, and bottle 2.

In producing the compartmented bottle of FIGS. 2 and 3, the sub-assembly of the insert 8 and bags 11 is set up as described with respect to the embodiment of FIG. 1. However, prior to insertion of said sub-assembly into bottle 2, the adhesive layer 14 is applied to the interior surface of the bottle by spraying. In this instance, after the bags 11 are inserted into the bottle 2 by means of the hollow prongs, the positive pressure, which is normally applied to the prongs primarily to facilitate their withdrawal as the sub-assembly remains in the bottle is in this instance, increased to assure that the outer surfaces of the bags 11 contact the adhesive layer 14 on the interior surface of the bottle 2, whereby proper adherence is assured.

FIG. 4 discloses a modification of the insert 8 utilized in the embodiment shown in FIG 1 and in the embodiment shown in FIGS. 2 and 3. As shown in said FIG. 4, the modified insert 8' consists essentially of a wall 10' equivalent to the wall 10 of insert 8, but in this case has a foot 9' provided at either end thereof which is contoured to sit within outlet opening 6 in neck portion 5 of the bottle 2. As appears in the cross-sectional view of said FIG. 4, the upper end 12' of one of the bags 11 will have a somewhat smaller cross-sectional dimension than that of the other bag. This, however, will have no detrimental effect, either on filling and/or emptying of the bag having the narrower upper end 12', as compared to the same use of the other bag 11.

Turning now to the embodiment of the invention disclosed in FIGS. 5–8, the bottle 22 per se shown therein is modified, as compared to the bottle 2 of the previously described embodiments, in that in said bottle 22, a dual neck 25 is provided therefor. Dual neck 25 is molded so that a pair of separate outlet openings 26, 26' are formed, which are kept out of communication with each other in the region of said dual neck 25, by a separating wall 30 molded of the glass of which the bottle 22 has been fabricated. Separating wall 30 extends downwardly only in the dual neck 25 and terminates at the lower region 28 of the latter, as indicated in FIG. 5.

Surrounding each of said outlet openings 26, 26', is a respective flange 27 and 27'. Said flanges 27, 27' are adapted to be engaged by a pair of crown caps 35, 35', which are slightly modified for this purpose, as described later on herein.

Attached to the inner surfaces of each of outlet openings 26, 26', respectively, of bottle 22, is the uper end 32, 32' of a respective plastic liner bag 31, each of which is adhered to a respective one of said outlet openings 26, 26' by a layer of adhesive 34. Further, in accordance with this embodiment of the invention, each of the bags 31 is provided with a folded over section 38 which is tacked to the main body of a respective bag 31 by a spot of separable adhesive 36, for a purpose which will appear hereinafter.

In the assembly of the modification of the compartmented bottle just described, the bottle 22 is first molded by conventional means so that it is provided with the aforesaid dividing wall 30 in the neck thereof, but with the remainder of the interior of the bottle undivided by any glass partition. In this instance, in the absence of any insert, a layer of adhesive 34 is applied to each of the outlet openings 26, 26' in the bottle 22, as by a small roller applicator. Each of the bags 31, with its fold 38 tacked to its side by the spot of adhesive 36, is respectively mounted on a prong similar to those utilized in the assembly of the previous embodiments. The prongs, each with a bag 31, respectively mounted thereon, and with negative pressure applied thereto, are inserted into the bottle via a respective one of outlet openings 26, 26'. Thereafter, positive pressure is then applied to the prongs to cause the upper ends of bags 31 to abut, and thereby to adhere to the layer of adhesive 34 on the surfaces of openings 26, 26'. The positive pressure is limited, however, so that the spots of adhesive 36 are not broken during this step of the assembly procedure. To this same end, the bags 31 are preferably mounted on the prongs so that the folds 38 thereof face each other, as shown in FIG. 8, thereby to provide mutual support to said folds 38 against the internal pressure applied via the insertion prongs.

After the filling of the respective bags 31 by a liquid under pressure, the pair of crown caps 35, 35' are crimped (at 39), one to each of the respective flanges 27, 27' of dual neck 25, thereby to seal the contents of each bag 31 under pressure. Because of the close proximity of outlet openings 26, 26', however, caps 37, 37' are slightly modified in that they have a small segment cut off at 38, 38', whereby they may be applied to seal a respective one of the outlet openings 26, 26' without interference between said caps.

In the use of the modified compartmented bottle 22 of FIGS. 5–8, one or the other of the crown seal caps 35, 35' may be removed by the usual cap removing implement, and the contents of the so-opened compartment imbibed by a straw or poured into a receptacle for drinking. With such use of the bottle 22, and the contents of the still sealed compartment bag 31 being under considerable pressure, for example, as in the case of a non-alcoholic soda or beer; the release of pressure on the previously abutting surface of the bag 31 still containing the liquid under pressure, instead of resulting in the bursting of the bag 31, is accommodated in the extra space provided by the expansion of the fold 38 at the bottom of the bag 31. The last occurs upon rupture of the spot of adhesive 36 due to said pressure. Alternatively, of course, both caps 35, 35' may be removed and the contents of both bags 31 imbibed simultaneously via a straw inserted into each, or poured from each simultaneously into a receptacle.

As will be understood to those skilled in the art, the foregoing embodiments of the invention may be variously modified without departing from the spirit and scope thereof. For example, in the embodiment of FIG. 1, the insert 8, in addition to being pressure-sealed into the opening 6 of the bottle 2, may be spot-glued thereto, as may also the bags 11 to the inner surface of the bottle and to each other. In the embodiment of FIG. 2, the adhesive obviously may be brushed on or applied by any other means than spraying. Obviously, also, the insert may be of a plastic other than polyethylene, or may be of a material other than plastic. Further, the bags may be translucent instead of transparent or may be tinted, colored or even opaque, and, similarly may be of other film-forming material than polyethylene. The folds 38, in the modification of the invention shown in FIGS. 5–8 may, of course, be provided at different locations, and/or may be provided as accordion or pleated structures. The bottles per se may be of a plastic material instead of glass, and may also be tinted, translucent, or even opaque, and the closures therefor may be other than of the crown cap seal type. Many other variations and/or modifications of embodiments of the present invention will occur to those skilled in the art and are contemplated herein.

I claim:

1. A compartmented bottle comprising a rigid body having a neck portion, outlet means provided in said neck portion, means adjacent said outlet means adapted to have attached thereto a sealing closure, at least two plastic bags within said rigid body, and means attaching the upper ends of said bags to an interior surface of said neck portion of said bottle in the region of said outlet means wherein said attaching means for said bags comprises a cylindrical wall having a diametrically extending wall provided integrally therewith.

2. A compartmented bottle comprising a rigid body having a neck portion, outlet means provided in said neck portion, means adjacent said outlet means adapted to have attached thereto a sealing closure, at least two plastic bags within said rigid body, and means attaching the upper ends of said bags to an interior surface of said neck portion of said bottle in the region of said outlet means wherein said attaching means comprises a diametrically disposed wall and a short mounting extension at each end thereof.

3. A compartmented bottle as defined in claim 1, wherein said rigid body is transparent or translucent, said attaching means comprises an insert mounted in said outlet means of said bottle, said plastic bags are also transparent or translucent, and are attached to said insert.

4. A compartmented bottle as defined in claim 3, wherein said insert is press-fitted in said outlet means of said bottle, and said plastic bags are heat-sealed to said insert.

5. A compartmented bottle as defined in claim 4, wherein the opposed surfaces of said bottle including those of the outlet means thereof, said insert, and said bags are adhered to each other by an adhesive.

6. A compartmented bottle as defined in claim 5, wherein each of said bags is filled with a potable liquid under pressure, and a single cap is sealingly mounted on said means adjacent said outlet means for sealing said bottle.

7. A compartmented bottle comprising a rigid body having a neck portion, outlet means provided in said neck portion, means adjacent said outlet means adapted to have attached thereto a sealing closure, at least two plastic bags within said rigid body, and means attaching the upper ends of said bags to an interior surface of said neck portion of said bottle in the region of said outlet means wherein said outlet means comprises a pair of side-by-side outlets separated by a wall of material integral with said neck portion of said body, means adjacent each of said outlets are adapted to have attached thereto a separate sealing closure, and each of said plastic bags is separately attached to the interior surface of a respective outlet.

8. A compartmented bottle as defined in claim 7, wherein each of said bags is provided with an expansible fold.

9. A compartmented bottle as defined in claim 7, wherein each of said bags is filled with a potable liquid under pressure, and a separate cap is sealingly mounted on each of said means adjacent each of said outlets for sealing the latter.

References Cited

UNITED STATES PATENTS 3,206,074    9/1965    Hoffmann _____ 222—94

GEORGE T. HALL, Primary Examiner

U.S. Cl. X.R.

206—47; 220—20, 63, 94